(12) United States Patent
Patil et al.

(10) Patent No.: US 9,639,424 B2
(45) Date of Patent: May 2, 2017

(54) SERVER RESET AND RECOVERY

(71) Applicant: Verizon Patent and Licensing Inc., Arlington, VA (US)

(72) Inventors: Sudhakar Reddy Patil, Irving, TX (US); Imtiyaz Shaikh, Irving, TX (US); Xuming Chen, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 46 days.

(21) Appl. No.: 14/685,039

(22) Filed: Apr. 13, 2015

(65) Prior Publication Data
US 2016/0299816 A1    Oct. 13, 2016

(51) Int. Cl.
*G06F 11/14* (2006.01)
*H04L 29/08* (2006.01)
*H04L 12/24* (2006.01)

(52) U.S. Cl.
CPC ......... *G06F 11/1441* (2013.01); *H04L 41/06* (2013.01); *H04L 67/14* (2013.01); *H04L 67/142* (2013.01); *G06F 2201/805* (2013.01)

(58) Field of Classification Search
CPC .................. G06F 11/1441; G06F 11/2023
See application file for complete search history.

(56) References Cited

U.S. PATENT DOCUMENTS

| 9,253,019 B1* | 2/2016 | Romanov | ........... H04L 67/1008 |
| 2003/0084100 A1* | 5/2003 | Gahan | ................. G06F 11/2023 709/203 |
| 2014/0281667 A1* | 9/2014 | Yu | ....................... H04L 61/1511 714/4.1 |

* cited by examiner

*Primary Examiner* — Yolanda L Wilson

(57) ABSTRACT

Systems and methods for server reset procedures are disclosed. Some implementations include determining, at a server, that the server is to be reset while currently being in connection to one or more peers, wherein the one or more peers store session information associated with the connection to the server, upon the determination and post reset, sending a notification from the server to the one or more peers connected to the server, and when the server reconnects with the one or more peers after the reset, automatically receiving the stored session information from the one or more peers.

21 Claims, 7 Drawing Sheets

- Content of Re-Auth Request from AAA to Peer (ePDG/HSGW/PGW)

< Re-Auth-Request > ::=   < Diameter Header: 258, REQ, PXY, 16777264 >

< Session-Id >
  { Origin-Host }
  { Origin-Realm }
  { Destination-Realm }
  { Destination-Host }
  { Auth-Application-Id }
  { Re-Auth-Request-Type } ⟵ Will be set to RESET
  [ User-Name ] ⟵ * OR leading IMSI digits identifying the affected subscribers
  ...
  *[ AVP ]

- Re-Auth-Request-Type
  - AUTHORIZE_ONLY 0
  - AUTHORIZE_AUTHENTICATE 1
  - RESET      800 ⟶ New value. Could be any number.

FIG. 4

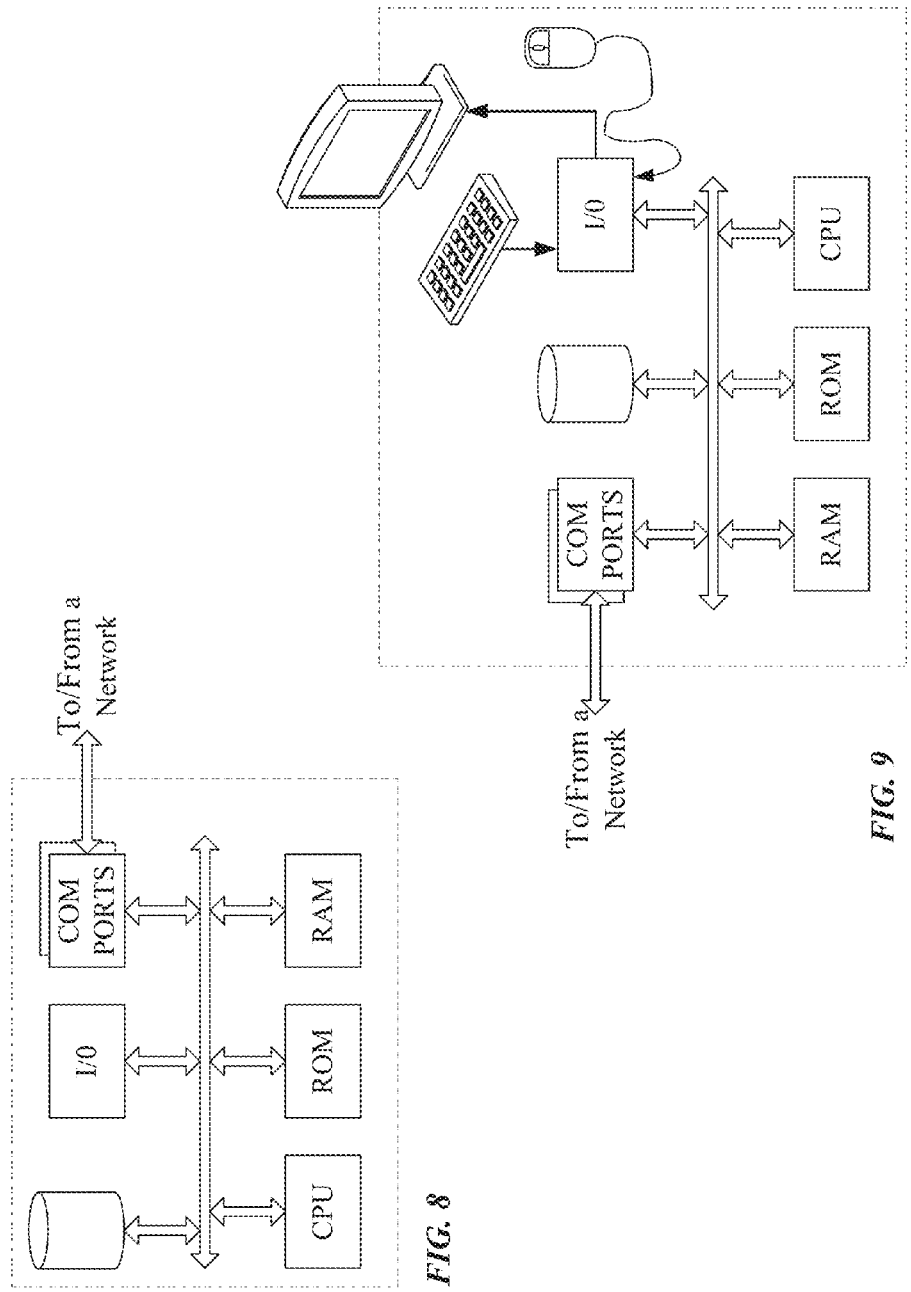

SERVER RESET AND RECOVERY

BACKGROUND

In recent years, mobile station (e.g., smartphone) usage has significantly increased. In some mobile networks, a 3rd Generation Partnership Project (3GPP) Authentication, Authorization, and Accounting (AAA) server supports authentication of user equipment (UE), access to non-3GPP networks and authorization of a UE's packet data sessions. When a 3GPP AAA server loses session information or becomes out of sync with its peers, current 3GPP specifications do not provide a mechanism for the 3GPP AAA Server to initiate reset procedures.

As the foregoing illustrates, a new approach for managing server reset procedures with consideration to such concern may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 illustrates exemplary content of a re-authorization request from an Authentication, Authorization, and Accounting (AAA) server to one or more peers.

FIG. 8 is a simplified functional block diagram of a computer that may be configured as a host or server, for example, to function as the AAA server in the system of FIG. 1.

FIG. 9 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various implementations disclosed herein relate to determining, at a server, that the server is to be reset while currently being in connection to one or more peers. The one or more peers may store session information associated with the connection to the server. Upon the determination and post reset, the server may send a notification to the one or more peers connected to the server. When the server reconnects with the one or more peers after the reset, the server may then automatically receive the stored session information from the one or more peers. The disclosed implementations are not limited to post reset procedures and may also be implemented during reset and post reset.

Reference now is made in detail to the examples illustrated in the accompanying drawings and discussed below.

Figure 1:
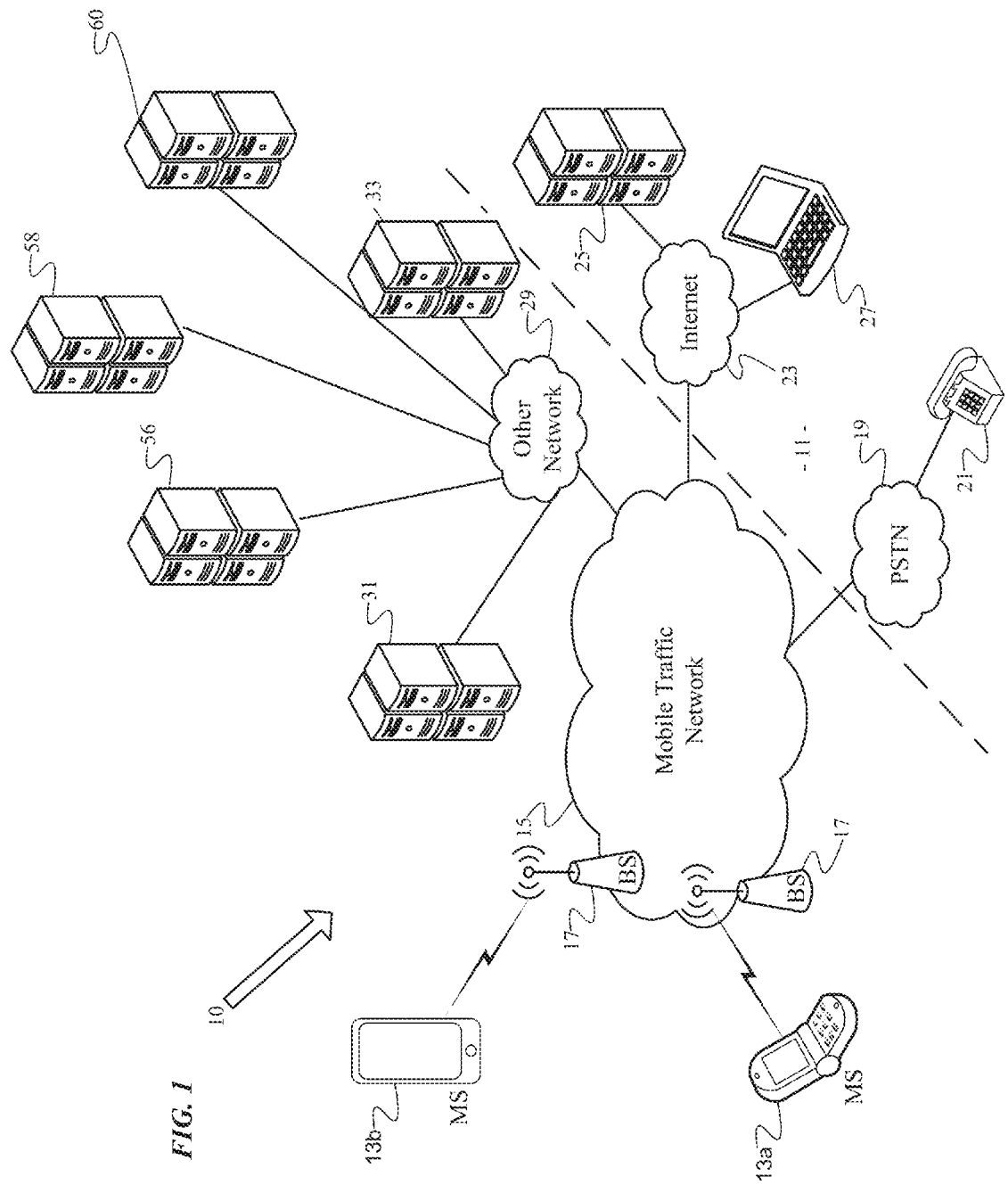
FIG. 1 is a high-level functional block diagram of an example of a system of networks/devices that provide various communications for mobile stations and support an example of the server reset and recovery service.

FIG. 1 illustrates a system 10 offering a variety of mobile communication services, including communications for server reset and recovery. The example shows simply two mobile stations (MSs) 13a and 13b as well as a mobile communication network 15. The stations 13a and 13b are examples of mobile stations that may be used for the server reset and recovery service. However, the network will provide similar communications for many other similar users as well as for mobile devices/users that do not participate in the server reset and recovery service. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 are capable of voice telephone communications through the network 15, and for the server reset and recovery services, the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks. The mobile stations 13a and 13 of users of the server reset and recovery service also can receive and execute applications written in various programming languages, as discussed more later.

Mobile stations 13 can take the form of portable handsets, smart-phones or personal digital assistants, although they may be implemented in other form factors. Program applications, including an application to assist in the server reset and recovery service and/or an application purchased via the on-line server reset and recovery service can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related AAA server 33 for the application service of server 31.

A mobile station 13 communicates over the air with a base station 17 and through the traffic network 15 for various voice and data communications, e.g. through the Internet 23 with a server 25 and/or with application servers 31. If the mobile service carrier offers the server reset and recovery service, the service may be hosted on a carrier operated application server 31, for communication via the networks 15 and 29. Alternatively, the server reset and recovery service may be provided by a separate entity (alone or through agreements with the carrier), in which case, the service may be hosted on an application server such as server 25 connected for communication via the networks 15 and 23. Server such as 25 and 31 may provide any of a variety of common application or service functions in support of or in addition to an application program running on the mobile station 13. However, for purposes of further discussion, we will focus on functions thereof in support of the mobile server reset and recovery service. For a given service, including the server reset and recovery service, an application program within the mobile station may be considered as a 'client' and the programming at 25 or 31 may be considered as the 'server' application for the particular service.

To insure that the application service offered by server 31 is available to only authorized devices/users, the provider of the application service also deploys an AAA server 33. The AAA server 33 could be a separate physical server as shown, or AAA server 33 could be implemented as another program module running on the same hardware platform as the server application 31. Essentially, when the server application (server 31 in our example) receives a service request from a client application on a mobile station 13, the server application provides appropriate information to the AAA server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10. A similar authentication function may be provided for server reset and recovery service(s) offered via the server 25, either by the server 33 if there is an appropriate arrangement between the carrier and the operator of server 24, by a program on the server 25 or via a separate authentication server (not shown) connected to the Internet 23.

In some implementations, the AAA server 33 automatically determines that the AAA server 33 server is to be reset while currently being in connection to one or more peers. The one or more peers can include, but are not limited to, High Rate Packet Data Serving Gateway (HSGW) 56, Evolved Packet Data Gateway (ePDG) 58 and Packet Data Networked Gateway (PGW) 60. The one or more peers store session information associated with the connection to the AAA server 33.

In some implementations, upon the determination and post reset of the AAA server 33, the AAA server 33 sends a notification to one or more peers (e.g, HSGW 56, ePDG 58 and PGW 60 connected to the server. Then, when the AAA server 33 reconnects with the one or more peers after the reset, the AAA server 33 automatically receives the stored session information from the one or more peers. In this way, the current implementations provide a mechanism for the AAA server 33 to initiate reset procedures that enable automatic session recovery.

Figure 2:
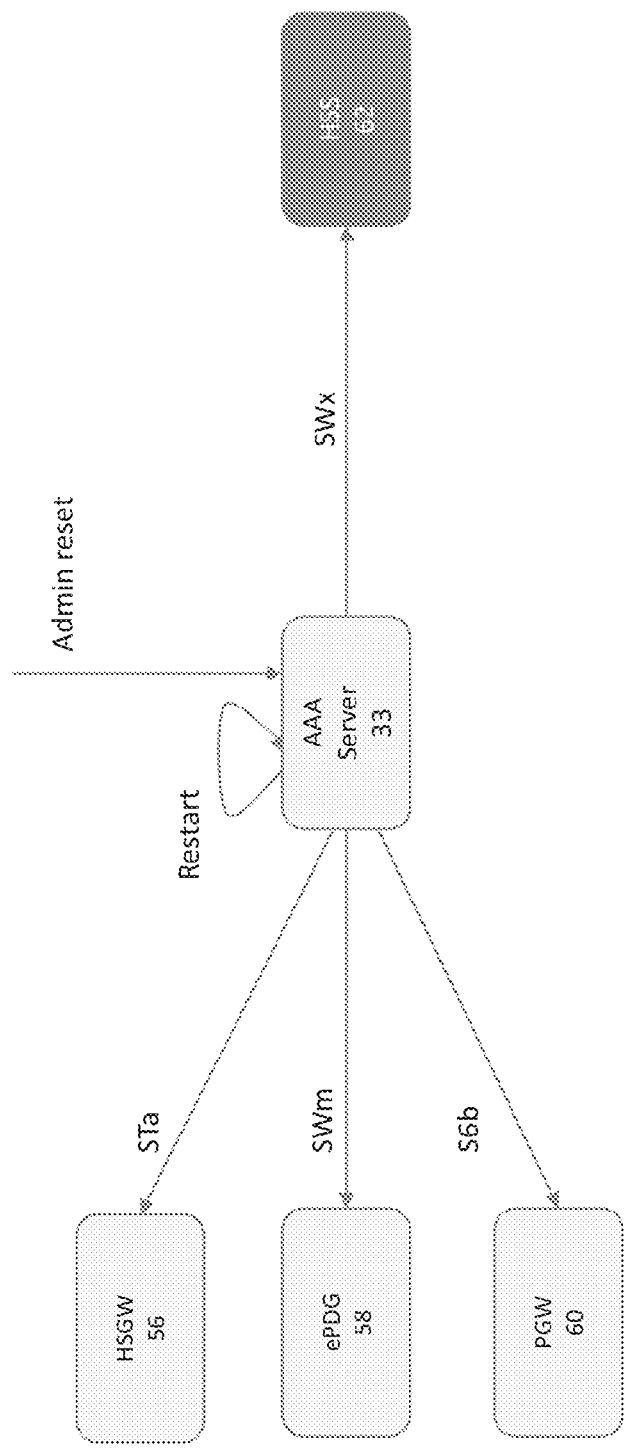
FIG. 2 is a high-level functional block diagram of a server in connection to one or more peers.

Referring to FIG. 2, in some implementations, connectivity between the AAA server 33 and the HSGW 56, ePDG 58 and PGW 60 may be established over 3GPP interfaces. These interfaces may include, but are not limited to, SWm, STa and S6b. The SWm interface is used for additional authentication parameters including subscription profiles and S2b option selection (which tunnel type to use). The S6b interface is used between Wi-Fi AAA 33 and the PGW 60 for tunnel authentication, static QoS and mobility (if applicable), etc. The STa interface is mainly used for EAP client authentication with Home Subscriber Server (HSS) 62 and S2a option selection (which tunnel type to use). The S6b interface between 3GPP AAA 33 and PGW 60 is used for tunnel authentication, static QoS and mobility (if applicable), etc. Referring to FIG. 2, the AAA server 33 communicates a reset indication to the HSGW S6 using a predefined STa Re-Auth Request. The AAA server 33 can also communicate a reset indication to ePDG using a predefined SWm Re-Auth Request. The 3G AAA server 33 communicates a reset indication to PGW 60 using a predefined S6b Re-Auth Request.

In some implementations, the conditions for the reset of the AAA server 33 can include one or more of: (a) a failure at the server 33 and loss of session information for one or more subscribers, (b) a failure at the server 33 causing the one or more subscribers stored in the server becoming invalid, or (c) invalidation of a specific set of subscriber sessions in the server 33 for administrative purposes.

In some implementations, upon receiving a reset indication from the AAA server 33, the one or more peers may identify subscriber sessions associated with the AAA server 33. For each subscriber session associated with the AAA server 33, the peers may send an authorization and accounting request with "auth-request-type" set to a restoration value.

Figure 3:
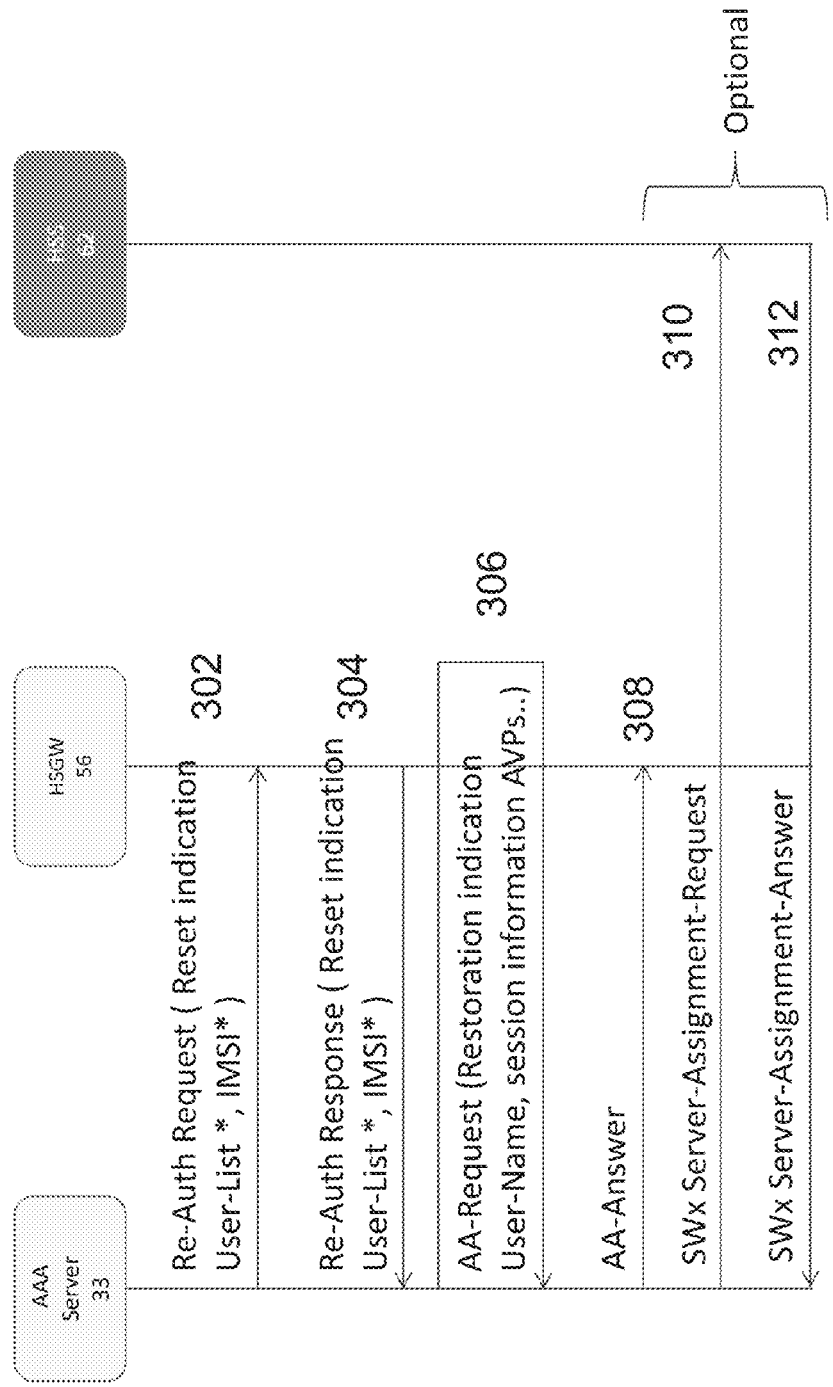
FIG. 3 is an examplary call flow between a server in connection with one or more peers.

FIG. 3 is an example call flow 300 between the AAA server 33 in connection with one or more peers. Call flow 300 begins with a re-authorization request 302 from the AAA server 33 to the HSGW 56. The re-authorization request may include a Reset indication User-List and an IMSI). Responsive to request 302, a re-authorization response 304 may be received from HSGW 56. The re-authorization response 304 may also include a reset indication, user-List and an IMSI.

Responsive to the re-authorization response 304 an authentication—authorization (AA) request 306 may be sent from the HSGW 56 to AAA server 33. The AA request 306 may include Restoration indication User-Name, session information Attribute Value Pairs (AVPs).

An AA answer 308 may then be sent from the AAA server 33 to HSGW 56. Other optional steps may include sending a SWx Server-Assignment-Request 310 from the AAA server 33 to the HSGW 56 and receiving a SWx Server-Assignment-Answer 312 at the AAA server 33 from the HSGW 56.

FIG. 4 illustrates a diagram of a Content of Re-Auth Request from the AAA server 33 to one or more peers (e.g, High Rate Packet Data Serving Gateway (HSGW) 56, Evolved Packet Data Gateway (ePDG) 58 and Packet Data Networked Gateway (PGW) 60). Referring to FIG. 4, the {Re-Auth-Request-Type} would be set to a value of "Reset" by the AAA server 33 indicating to the peers that the server is about to be reset. The [User-Name] field may include IMSI values of subscribers that are to be affected by the reset of the AAA server 33.

Figure 5:
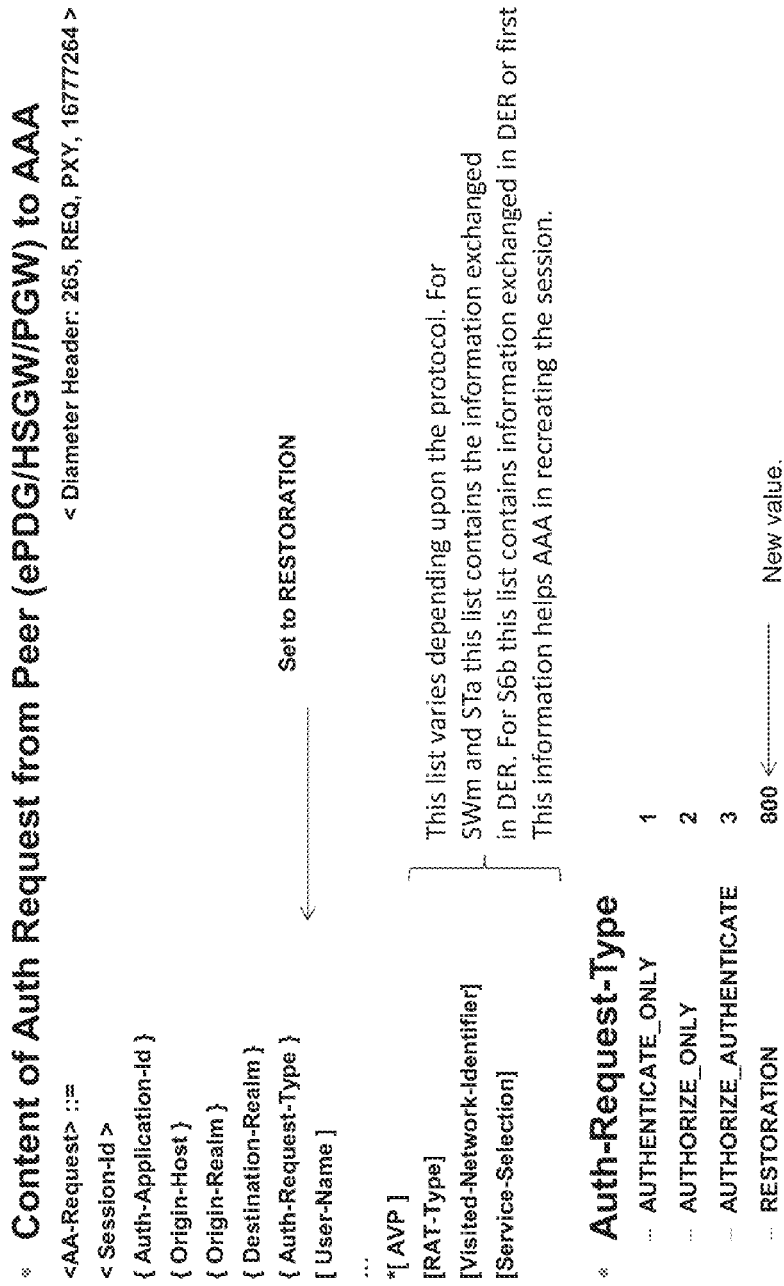
FIG. 5 illustrates exemplary content of an authorization request from a peer to the AAA server.

FIG. 5 illustrates the Content of Auth Request from a peer (e.g, High Rate Packet Data Serving Gateway (HSGW) 56, Evolved Packet Data Gateway (ePDG) 58 and Packet Data Networked Gateway (PGW) 60) to the AAA server 33. In this example, the {Auth-Request-Type} may be set to a value of "Restoration" by the HSGW 56.

The list of parameters of [RAT-Type], [Visited-Network-Identifier] and [Service-Selection] may vary depending on the protocol. For example, for interfaces such as SWm and STa, this list contains the information exchanged in a Diameter-EAP-Request (DER). For S6b this list contains information exchanged in DER or a first AA request.

This information helps the AAA server 33 in recreating a terminated session after the reset of the AAA server 33. For example, the AAA server 33 builds session information based on restoration information received from one or more of HSGW 56, ePDG 58 and PGW 60. The AAA server 33 may optionally update a Home Subscriber Server (HSS) 62 by sending SWx Server-Assignment-Request (SAR) message.

In this way, the current implementations provide a mechanism for the AAA server 33 to initiate reset procedures that enable automatic session recovery.

The enhanced server reset and recovery service under consideration here may be delivered to touch screen type mobile stations as well as to non-touch type mobile stations. Hence, our simple example shows the mobile station (MS) 13*a* as a non-touch type mobile station and shows the mobile station (MS) 13 as a touch screen type mobile station. Implementation of the on-line server reset and recovery service will involve at least some execution of programming in the mobile stations as well as implementation of user input/output functions and data communications through the network 15, from the mobile stations.

Those skilled in the art presumably are familiar with the structure, programming and operations of the various type of mobile stations. However, for completeness, it may be useful to consider the functional elements/aspects of two exemplary mobile stations 13*a* and 13*b*, at a high-level.

For purposes of such a discussion, FIG. 4 provides a block diagram illustration of an exemplary non-touch type mobile station 13*a*. Although the mobile station 13*a* may be a smart-phone or may be incorporated into another device, such as a personal digital assistant (PDA) or the like, for discussion purposes, the illustration shows the mobile station 13*a* is in the form of a handset. The handset embodiment of the mobile station 13*a* functions as a normal digital wireless telephone station. For that function, the station 13*a* includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13*a* also includes at least one digital transceiver (XCVR) 108. Today, the handset 13*a* would be configured for digital wireless communications using one or more of the common network technology types. The concepts discussed here encompass embodiments of the mobile station 13*a* utilizing any digital transceivers that conform to current or future developed digital wireless communication standards. The mobile station 13*a* may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13*a* and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during server reset and recovery.

A microprocessor 112 serves as a programmable controller for the mobile station 13a, in that it controls all operations of the mobile station 13a in accord with programming that it executes, for all normal operations, and for operations involved in the server reset and recovery procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for providing server reset and recovery.

Figure 7:
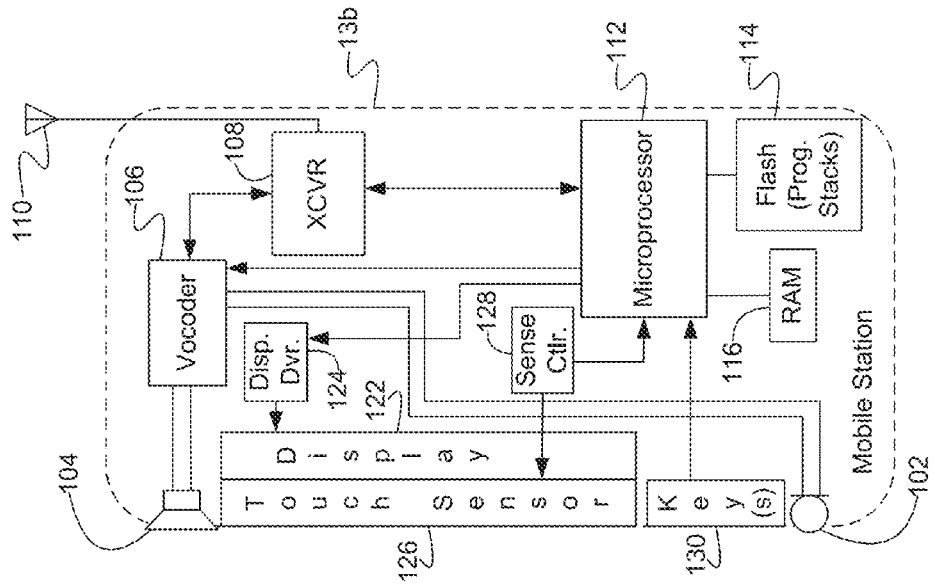
FIG. 7 is a high-level functional block diagram of an exemplary touch screen type mobile station as may utilize the server reset and recovery service through a network/system like that shown in FIG. 1.

For purposes of such a discussion, FIG. 7 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 7. For example, the touch screen type mobile station 13b includes a microphone 102, speaker 104 and vocoder 106, for audio input and output functions, much like in the earlier example. The mobile station 13b also includes a at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the server reset and recovery procedure under consideration here. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming stored in the flash memory 114 configures the processor so that the mobile station is capable of performing various desired functions, including in this case the functions involved in the technique for providing server reset and recovery.

Figure 6:
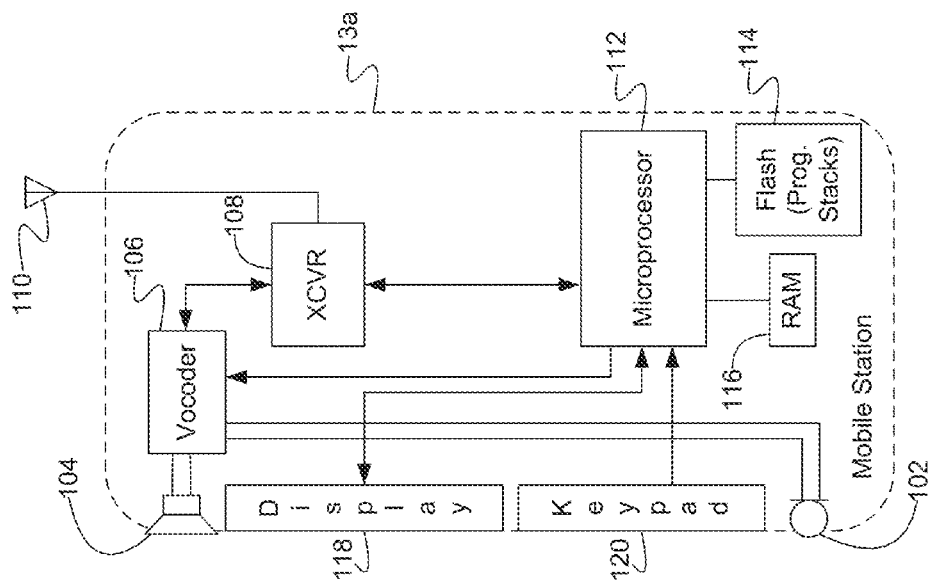
FIG. 6 is a high-level functional block diagram of an exemplary non-touch type mobile station as may utilize the server reset and recovery service through a network/system like that shown in FIG. 1.

In the example of FIG. 6, the user interface elements included a display and a keypad. The mobile station 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provide touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output, including with respect to some server reset and recovery related functions.

The structure and operation of the mobile stations 13a and 13b, as outlined above, were described to by way of example, only.

As shown by the above discussion, functions relating to the an enhanced experience for the server reset and recovery service, via a graphical user interface of a mobile station may be implemented on computers connected for data communication via the components of a packet data network, operating as an AAA server 33 as shown in FIG. 1. Although special purpose devices may be used, such devices also may be implemented using one or more hardware platforms intended to represent a general class of data processing device commonly used to run "server" programming so as to implement the server reset and recovery functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the server reset and recovery. The software code is executable by the general-purpose computer that functions as the server reset and recovery server and/or that functions as a server reset and recovery terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for server reset and recovery, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of server reset and recovery outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the host that will be the authentication server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the server reset and recovery, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining, at a server connected to one or more peers, that the server is to be reset, wherein the one or more peers store session information associated with the connection to the server;
   resetting the server and, upon determining that the server is reset, sending a notification from the server to the one or more peers; and
   when the server reconnects with the one or more peers after the reset, automatically receiving the stored session information from the one or more peers,
   wherein the notification includes a re-authorization request including a reset indication.

2. The method of claim 1, wherein the server is an Authentication, Authorization, and Accounting (AAA) server and the one or more peers include High Rate Packet Data Serving Gateway (HSGW), Evolved Packet Data Gateway (ePDG) and Packet Data Networked Gateway (PGW).

3. The method of claim 2, wherein the AAA server communicates the reset indication to the HSGW using a predefined STa re-authorization request.

4. The method of claim 2, wherein the AAA server communicates the reset indication to the ePDG using a predefined SWm re-authorization request.

5. The method of claim 2, wherein the AAA server communicates the reset indication to the PGW using a predefined S6b re-authorization request.

6. The method of claim 1, wherein the server is reset based on one or more of:
   (a) a failure at the server and a loss of session information for one or more subscribers,
   (b) a failure at the server causing one or more subscriber identifiers stored in the server becoming invalid, or
   (c) invalidation of a specific set of subscriber sessions in the server.

7. The method of claim 1, wherein upon receiving the re-authorization request including the reset indication from the server, the one or more peers:
   identify subscriber sessions associated with the server; and
   for each subscriber session associated with the server, send an authorization and accounting request with auth-request-type set to a restoration value.

8. The method of claim 1, wherein the reset indication is a value of a re-authorization request type field in the re-authorization request.

9. A server, comprising:
a communication interface configured to enable communication via a mobile network;
a processor coupled with the communication interface;
a storage device accessible to the processor; and
an executable program in the storage device, wherein execution of the program by the processor configures the server to perform functions, including functions to:
determine, at the server, that the server is to be reset, wherein the server is connected to one or more peers, and the one or more peers store session information associated with the connection to the server;
reset the server and, upon the determination and post reset, send a notification from the server to the one or more peers; and
when the server reconnects with the one or more peers after the reset, automatically receive the stored session information from the one or more peers,
wherein the notification includes a re-authorization request including a reset indication.

10. The server of claim 9, wherein the server is an Authentication, Authorization, and Accounting (AAA) server and the one or more peers include High Rate Packet Data Serving Gateway (HSGW), Evolved Packet Data Gateway (ePDG) and Packet Data Networked Gateway (PGW).

11. The server of claim 10, wherein the AAA server communicates the reset indication to the HSGW using a predefined STa re-authorization request.

12. The server of claim 10, wherein the AAA server communicates the reset indication to the ePDG using a predefined SWm re-authorization request.

13. The server of claim 10, wherein the AAA server communicates the reset indication to the PGW using a predefined S6b re-authorization request.

14. The server of claim 9, wherein the server is reset based on one or more of:
(a) a failure at the server and a loss of session information for one or more subscribers,
(b) a failure at the server causing one or more subscribers identifiers stored in the server becoming invalid, or
(c) invalidation of a specific set of subscriber sessions in the server.

15. The server of claim 9, wherein upon receiving the re-authorization request including the reset indication from the server, the one or more peers:
identify subscriber sessions associated with the server; and
for each subscriber session associated with the server, send an authorization and accounting request with auth-request-type set to a restoration value.

16. A non-transitory computer-readable medium comprising instructions which, when executed by one or more computers, cause the one or more computers to:
determine, at a server connected to one or more peers, that the server is to be reset, wherein the one or more peers store session information associated with the connection to the server;
reset the server and, upon the determination that the server is to be reset, send a notification from the server to the one or more peers; and
when the server reconnects with the one or more peers after the reset, automatically receive the stored session information from the one or more peers,
wherein the notification includes a re-authorization request including a reset indication.

17. The computer readable medium of claim 16, wherein the server is an Authentication, Authorization, and Accounting (AAA) server and the one or more peers include High Rate Packet Data Serving Gateway (HSGW), Evolved Packet Data Gateway (ePDG) and Packet Data Networked Gateway (PGW).

18. The computer readable medium of claim 17, wherein the server is reset based on one or more of:
(a) a failure at the server and a loss of session information for one or more subscribers,
(b) a failure at the server causing one or more subscriber identifiers stored in the server becoming invalid, or
(c) invalidation of a specific set of subscriber sessions in the server.

19. The computer readable medium of claim 17, wherein upon receiving the re-authorization request including the reset indication from the server, the one or more peers:
identify subscriber sessions associated with the server; and
for each subscriber session associated with the server, send an authorization and accounting request with auth-request-type set to a restoration value.

20. The computer readable medium of claim 17, wherein the AAA server communicates the reset indication to the HSGW using a predefined STa re-authorization request.

21. The computer readable medium of claim 17, wherein the AAA server communicates the reset indication to the ePDG using a predefined SWm re-authorization request.

* * * * *